(12) United States Patent
Xue et al.

(10) Patent No.: US 12,557,012 B2
(45) Date of Patent: Feb. 17, 2026

(54) DYNAMIC POWER SAVING FOR WIRELESS ACCESS POINTS BASED ON CLIENT DISTRIBUTION

(71) Applicant: Cisco Technology, Inc., San Jose, CA (US)

(72) Inventors: Ruifeng Xue, Shanghai (CN); Kai Ma, Shanghai (CN); Xiangpeng Yao, Shanghai (CN); Li Zhang, Shanghai (CN); Baojun Zhang, Shanghai (CN); Jun Liu, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 600 days.

(21) Appl. No.: 18/073,661

(22) Filed: Dec. 2, 2022

(65) Prior Publication Data

US 2024/0187983 A1    Jun. 6, 2024

(51) Int. Cl.
  *H04W 52/02* (2009.01)
(52) U.S. Cl.
  CPC .............................. *H04W 52/0206* (2013.01)
(58) Field of Classification Search
  CPC .................................................. H04W 52/0206
  See application file for complete search history.

(56) References Cited

U.S. PATENT DOCUMENTS

| | | |
|---|---|---|
| 8,023,444 B2 | 9/2011 | Bowser et al. |
| 8,276,010 B2 | 9/2012 | Vavilala et al. |
| 8,537,735 B2 | 9/2013 | Bowser et al. |
| 10,251,129 B2 | 4/2019 | Carty et al. |
| 2017/0026888 A1 | 1/2017 | Kwan |
| 2020/0396580 A1 | 12/2020 | Gilson et al. |
| 2022/0094072 A1 | 3/2022 | Kalavakuru et al. |

FOREIGN PATENT DOCUMENTS

| | | |
|---|---|---|
| CN | 109660995 A | 4/2019 |
| CN | 115002884 A | 9/2022 |

OTHER PUBLICATIONS

Nagareda, R., et al., International Conference on Computing, Networking and Communications, Wireless Networks Symposium, "A Proposal of Power Saving Scheme for Wireless Access Networks with Access Point Sharing," https://ieeexplore.ieee.org/document/6167384, Jan. 30, 2012-Feb. 2, 2012, 5 pages.

(Continued)

*Primary Examiner* — Gbemileke J Onamuti
(74) *Attorney, Agent, or Firm* — Edell, Shapiro & Finnan, LLC

(57) ABSTRACT

A method, computer system, and computer program product are provided for dynamic power saving for wireless access points. It is determined that a wireless client has not requested to connect to a first access point for a first threshold duration of time. Power is disabled to one or more front-end modules of a plurality of front-end modules associated with the first access point except for one designated front-end module that remains powered. Monitoring is performed for an incoming request to connect to the first access point. Power is restored to the one or more front-end modules of the plurality of front-end modules.

20 Claims, 9 Drawing Sheets

(56) References Cited

OTHER PUBLICATIONS

Cisco, Neighbor Discovery Protocol Mode on Access Points, "Information About Neighbor Discovery Protocol Mode," https://www.cisco.com/c/en/us/td/docs/wireless/controller/9800/17-5/config-guide/b_wl_17_5_cg/m_configuring_ndp-mode_on_access_point.pdf, retrieved Dec. 2, 2022, 6 pages.

Cisco, AP Power Save, "Feature History for AP Power Save," https://www.cisco.com/c/en/us/td/docs/wireless/controller/9800/17-8/config-guide/b_wl_17_8_cg/m_access_point_power_control.pdf, retrieved Dec. 2, 2022, 12 pages.

Cisco, "Configure Scheduler on a Wireless Access Point," Document ID: SMB2191, https://www.cisco.com/c/en/us/support/docs/smb/wireless/cisco-small-business-100-series-wireless-access-points/smb2191-configure-scheduler-on-a-wireless-access-point.html, Dec. 13, 2018, 6 pages.

DYNAMIC POWER SAVING FOR WIRELESS ACCESS POINTS BASED ON CLIENT DISTRIBUTION

TECHNICAL FIELD

The present disclosure relates generally to wireless networking, and more specifically, to a dynamic power saving scheme for wireless access points that is based on client distribution.

BACKGROUND

Wireless communication protocols, such as the IEEE 802.11 family of wireless communication standards, were typically drafted under the assumption that access points would be mains-powered. Thus, devices would always operate in an active power mode in which power consumption was not a primary concern. Subsequently, there have been proposals to include a standby mode in devices in order to reduce energy consumption. In conventional deployments, however, access points are maintained in a standby mode, even when there are no clients currently associated with those access points.

DETAILED DESCRIPTION

Overview

Figure 1:
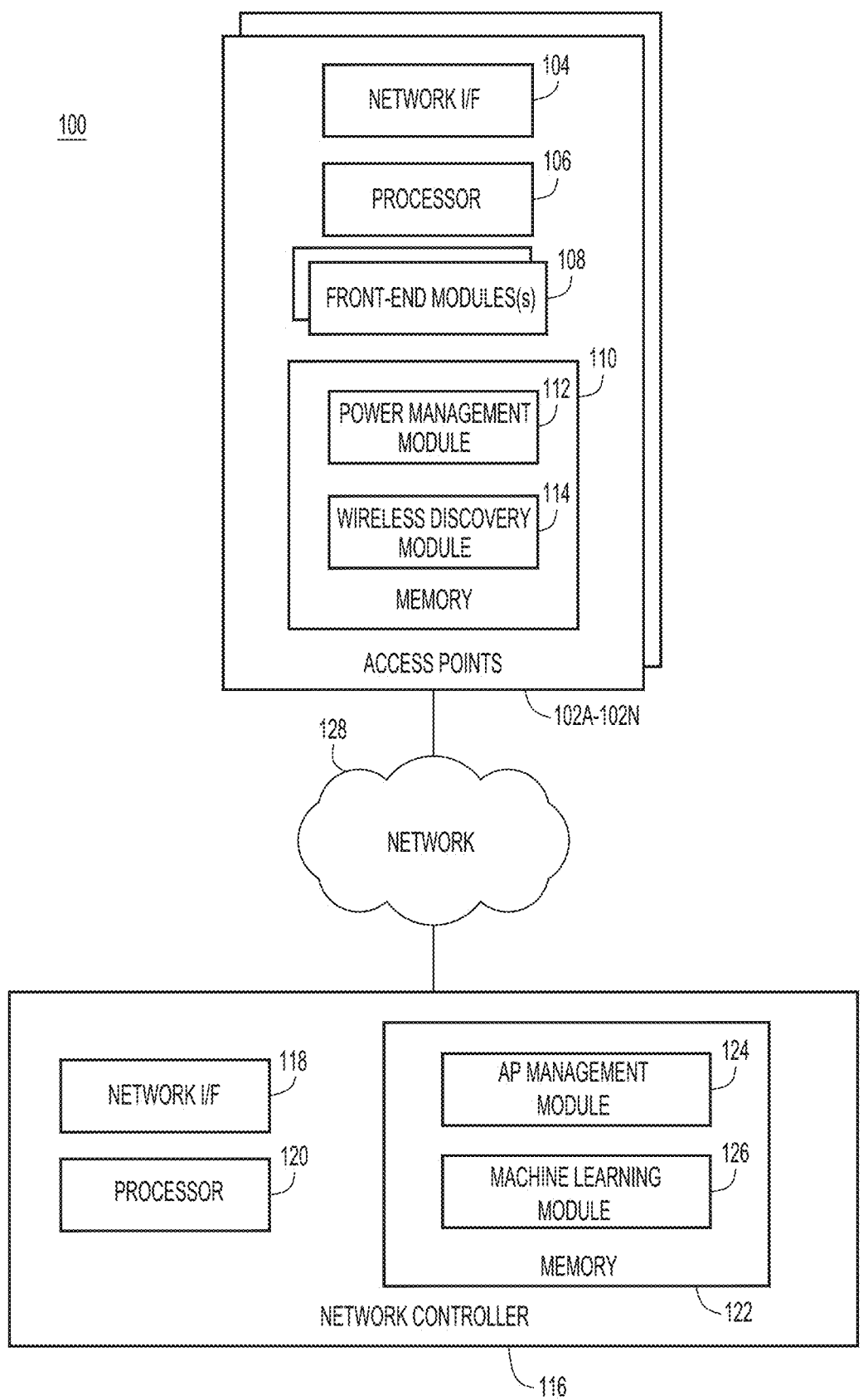
FIG. 1 is a block diagram of a networking environment for dynamically managing the power consumption of access points, according to an example embodiment.

According to one embodiment, techniques are provided for dynamic power saving for wireless access points. It is determined that a wireless client has not requested to connect to a first access point for a first threshold duration of time. Power is disabled to one or more front-end modules of a plurality of front-end modules associated with the first access point except for one designated front-end module that remains powered. Monitoring is performed for an incoming request to connect to the first access point. Power is restored to the one or more front-end modules of the plurality of front-end modules.

Example Embodiments

Recently, there has been a trend in the field of wireless communication to focus on power consumption, particularly with respect to reducing the amount of power that networking devices require in order to operate. Conventional approaches typically implement a low-power or standby mode in which devices can save power by reducing transmitting power outputs and the like. However, even these low-power modes still require some amount of power in order to operate. Other solutions typically involve a calendar-based power management approach in which network devices are powered down at certain times of day (e.g., after business hours). These approaches require an a priori understanding of an enterprise's network activity, and cannot handle unexpected or irregular situations.

In contrast, present embodiments provide a framework that manages network devices (e.g., access points) in a dynamic manner that is based on the actual requirements of wireless clients. These embodiments provide the ability to automatically manage power consumption of a wireless network in a manner that is driven by client association or distribution. Power consumption is reduced by disabling the supply of power to specific components of access points in a manner that enables the access points to continue to provide service to a location. In particular, access points typically include several radio-frequency (RF) front-end modules (FEMs) that serve as the radio antennae to enable wireless communication in various frequencies, such as the 2.4 GHz frequency and the 5 GHz frequency. Present embodiments selectively provide power to these FEMs in order to reduce the overall power consumption of an access point, achieving even greater power savings than conventional low-power modes while providing the ability to respond to client association requests.

Moreover, present embodiments provide schemes for managing groups of access points in addition to (and in combination with) managing individual access points. In particular, a representative access point, referred to herein as a duty access point, can be identified and selected as an access point that serves on behalf of other access points, which can be powered down until subsequent client requests necessitate the re-activation of the other access points.

Thus, present embodiments improve the field of wireless communication by reducing the power consumption of a deployment of wireless access points using various schemes, or combinations thereof, that avoid any impact to quality of service. The techniques described herein have the practical application of reducing power consumption of hardware, reducing wear on hardware, and accordingly reducing costs. Additionally, present embodiments automatically adjust power management strategies in a manner that can employ machine learning to adaptively identify patterns, thus avoiding any manual user intervention. Accordingly, present embodiments can improve the efficiency of networking by automating power management while reducing power consumption greatly beyond conventional lower-power-mode techniques.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments will now be described in detail with reference to the Figures. FIG. 1 is a block diagram of a networking environment 100 for dynamically managing the power consumption of access points, according to an example embodiment. As depicted, networking environment 100 includes access points 102A-102N, a network controller 116, and a network 128. It is to be understood that the functional division among components of networking environment 100 have been chosen for purposes of explaining various embodiments and is not to be construed as a limiting example.

Access points 102A—120N each include a network interface (I/F) 104, at least one processor 106, a plurality of front-end modules (FEMs) 108, and memory 110, which stores instructions for a power management module 112 and a wireless discovery module 114. In various embodiments, each access point 102A—120N may include a wireless (and optionally, a wired) access point capable of executing computer readable program instructions. Network interface 104 enables components of each access point 102A-102N to send and receive data over a network, such as network 128. Together, access points 102A-102N may collectively form a wireless network, such as a mesh network. In general, access points 102A-102N may be deployed at particular locations of an area (e.g., an indoors area, outdoors area, or combination thereof) that are selected in order to provide coverage for client devices in the area.

FEMs 108 may include any radio antennae capable of transmitting and/or receiving in a radio frequency or other spectrum. FEMs 108 may consume different amounts of energy based on different settings. For example, FEMs 108 may transmit data at a particular wattage according to an active mode, and may transmit data at a lower wattage according to a standby mode. In various embodiments, each FEM 108 may include a transceiver that corresponds to a particular radio frequency, communication protocol, or combination thereof. For example, FEMs 108 may include one or more FEMs 108 for 5 GHz communication, 2.4 GHz communication, Long-Term Evolution (LTE), Wi-Fi®, Near-Field Communication (NFC), Bluetooth®, and the like.

Power management module 112 and wireless discovery module 114 may include one or more modules or units to perform various functions of the embodiments described below. Power management module 112 and wireless discovery module 114 may be implemented by any combination of any quantity of software and/or hardware modules or units, and may reside within memory 110 of any of access points 102A-102N for execution by a processor, such as processor 106.

Power management module 112 provides control of aspects of the power consumption of each access point 102A-102N, including controlling the amount of power consumed (e.g., adjusting transmit wattage) and/or controlling whether certain hardware components (e.g., FEMs 108) are provided with power. Power management module 112 may manage power based on predetermined conditions and/or instructions received from another network device, such as network controller 116. Thus, each access point 102A-102N may independently adjust power consumption based on client distribution, and additionally or alternatively, power management module 112 may receive instructions to enable access points 102A-102N to collectively coordinate a power management scheme in accordance with present embodiments. Power management module 112 may manage the power of each access point 102A-102N by disabling power to one or more FEMs. In some embodiments, a switch is inserted between a power source and a FEM in order to disable power to the FEM. In other embodiments, existing general-purpose input-output (GPIO) control signals are utilized to change a FEM to its lowest power consumption mode. Additionally or alternatively, power to access points 102A-102N may be remotely controlled using power over ethernet (POE) or other mechanisms, thereby enabling entire access points 102A-102N to be disabled by another entity (e.g., network controller 116).

Wireless discovery module 114 enables access points 102A-102N to discover each other wirelessly (e.g., via FEMs 108) in order to measure signal strengths and adjust broadcast power accordingly. In some embodiments, a particular access point may be designated as a duty access point, which serves as the sole access point for a group of access points 102A-102N during a power management scheme in which the other access points 102A-102N are powered down. In order to identify and configure a duty access point, wireless discovery module 114 may analyze the received signal strength indicator (RSSI) of packets received from neighboring access points 102A-102N in order to identify whether the duty access point overlaps with other duty access points of other groups. Wireless discovery module 114 may adjust the broadcast power of a duty access point in order to optimize the RSSI of received packets from other duty access points so that the RSSI of each packet (or an average RSSI from each neighboring duty access point falls within a predetermined range (e.g., −90 dBm to −60 dBm, etc.). Thus, the transmit power of duty access points can be configured by wireless discovery module 114 in order to measure how closely a duty access point's Basic Service Set (BSS) touches or overlaps with neighboring BSSs. In addition to RSSI, the number or percentage of dropped packets can serve as a key service indicator for coverage hole detection. Wireless discovery module 114 may perform this process for any access point, including access points that are currently serving as duty access points or regular access points, and the process can be performed regularly (e.g., according to a predefined schedule) or on an ad hoc basis.

Network controller 116 includes a network interface (I/F) 118, at least one processor 120, and memory 122. Memory 122 may store instructions for an access point (AP) management module 124, and a machine learning module 126. In various embodiments, network controller 116 may include a rack-mounted server, desktop, switch, wireless local area network controller (WLC), or any other programmable electronic device capable of executing computer readable program instructions. Network interface 118 enables components of network controller 116 to send and receive data over a network, such as network 128. In general, network controller 116 manages access points 102A-102N in order to enforce various power schemes in accordance with present embodiments.

AP management module 124 and machine learning module 126 may include one or more modules or units to perform various functions of the embodiments described below. AP management module 124 and machine learning module 126 may be implemented by any combination of any quantity of software and/or hardware modules or units, and may reside within memory 122 of network controller 116 for execution by a processor, such as processor 120.

AP management module 124 enables network controller 116 to manage a group of access points 102A-102N by monitoring client associations and distributions and enacting power management schemes accordingly. In some embodiments, while each access point 102A-102N includes wireless communication components for communication with clients, the access points 102A-102N also include wired network components (e.g., ethernet) in order to exchange data with network controller 116 over a wire. However, network controller 116 may wirelessly communicate with some or all of the access points 102A-102N.

In some embodiments, AP management module 124 receives data from access points 102A-102N relating to any associated clients, such as the number of associated clients and/or the number of requests from clients to associate with an access point. Thus, when there has not been a request from a client to join any access point 102A-102N for a threshold duration of time, AP management module 124 can transmit instructions to cause the group of access points 102A—102N to engage in a defined power scheme. In particular, AP management module 124 may cause power to be disabled to access points 102A-102N except for one duty access point that remains active in order to listen for client association requests on behalf of the group of access points 102A—102N. AP management module 124 may also transmit instructions to enable power to access points 102A-102N when a condition is met, such as a client request being received by a duty access point. Thus, AP management module 124 may communicate with some or all of the access points 102A-102N, or duty access points (depending on the current power scheme), in order to manage access points 102A-102N in accordance with present embodiments.

Machine learning module 126 may include one or more machine learning models that are trained to identify power management parameters that can be used to enforce various power management schemes in accordance with present embodiments. The particular machine learning model that is employed may include any neural network, support vector machine, and the like. A machine learning model may be trained using training data that includes examples of historical usage patterns of networks (e.g., in a time-series format) and corresponding associations between clients and access points. In some embodiments, the training data may include examples of threshold durations of time after which a particular power management scheme should be enacted. Thus, the machine learning model can learn to predict, based on real historical data gathered from a deployment, whether certain access points will have associated clients and/or the model may predict threshold durations of time to be used for power management. The output of a trained machine learning model can accordingly be used to configure a deployment of access points based on actual usage data collected by those access points.

Network 128 may include a local area network (LAN), a wide area network (WAN) such as the Internet, or a combination of the two, and includes wired, wireless, or fiber optic connections. In general, network 128 can be any combination of connections and protocols known in the art that will support communications between access points 102A-102N and network controller 116 via their respective network interfaces in accordance with the described embodiments.

Figure 2:
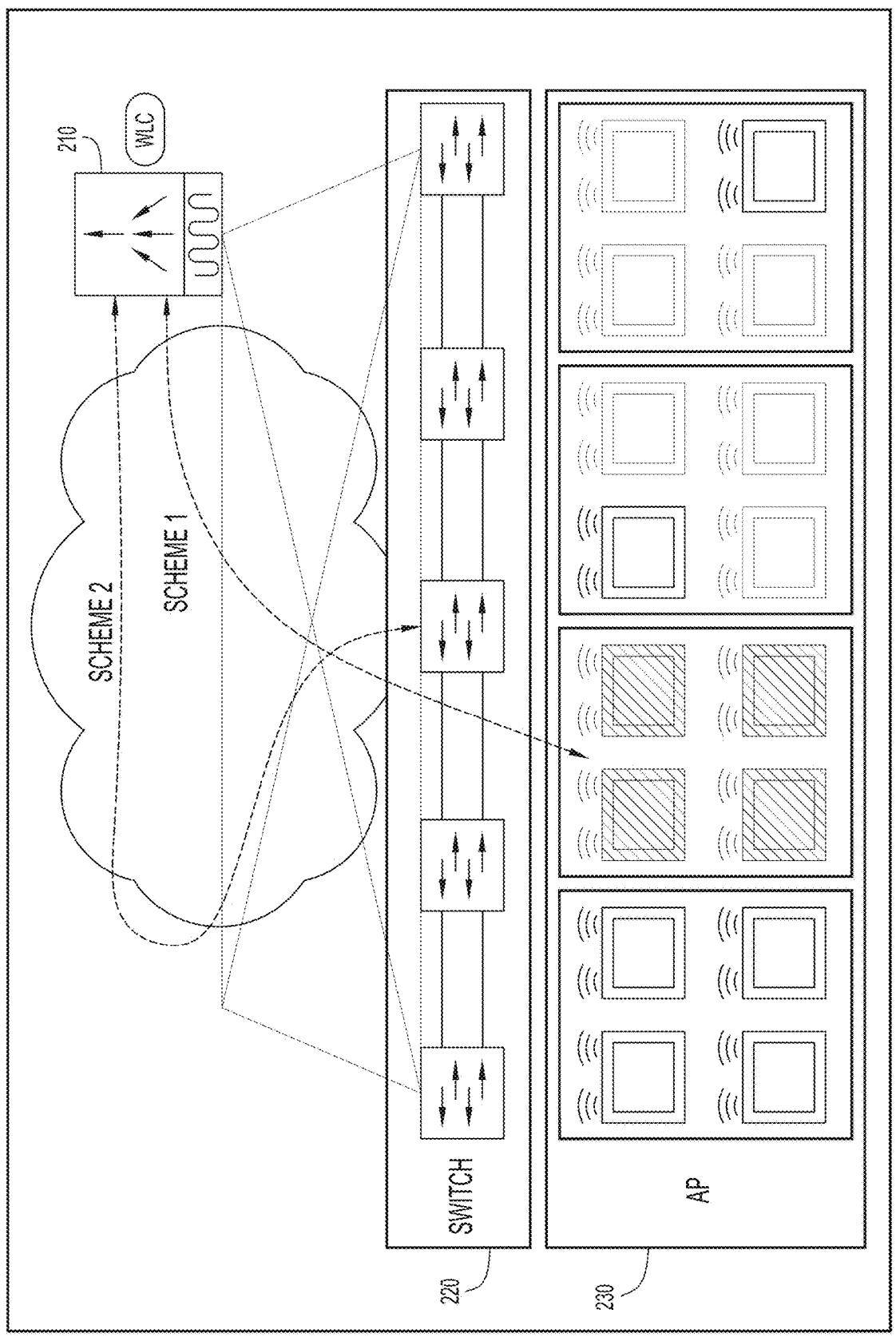
FIG. 2 is a block diagram depicting a network topology with power saving schemes, according to an example embodiment.

Reference is now made to FIG. 2. FIG. 2 is a block diagram depicting a network topology 200 with power saving schemes, according to an example embodiment. As depicted, network topology 200 includes a wireless local area network controller (WLC) 210, a plurality of switches 220, and a plurality of access points 230. In some embodiments, WLC 210 and/or access points 230 may correspond to network controller 116 and access points 102A-102N, respectively, as depicted and described in further detail with respect to FIG. 1.

In one embodiment, WLC 210 of network topology 200 may communicate with access points 230 via switches 220. WLC 210 can transmit instructions to switches 220 in order to power off or power on individual ethernet ports, which provide power to access points via PoE, thus enabling WLC 210 to directly manage the power state of specific access points 230. Thus, switches 220 act as an intermediary layer between WLC 210 and access points 230 to physically enable or disable power to specified devices.

Access point 230 may collect client distribution information (e.g., client associations with particular access points, which indicates physical locations of clients), and pass the client distribution information to WLC 210 for analysis in order to make decisions regarding the implementation of various power schemes. The client distribution information may accordingly dictate when WLC 210 causes switches 220 to disable power to specific access points 230 (e.g., "scheme 2"). Additionally, access points 230 can independently enforce power management schemes by enabling or disabling power to specific FEMs associated with each access point (e.g., "scheme 1").

Figure 3:
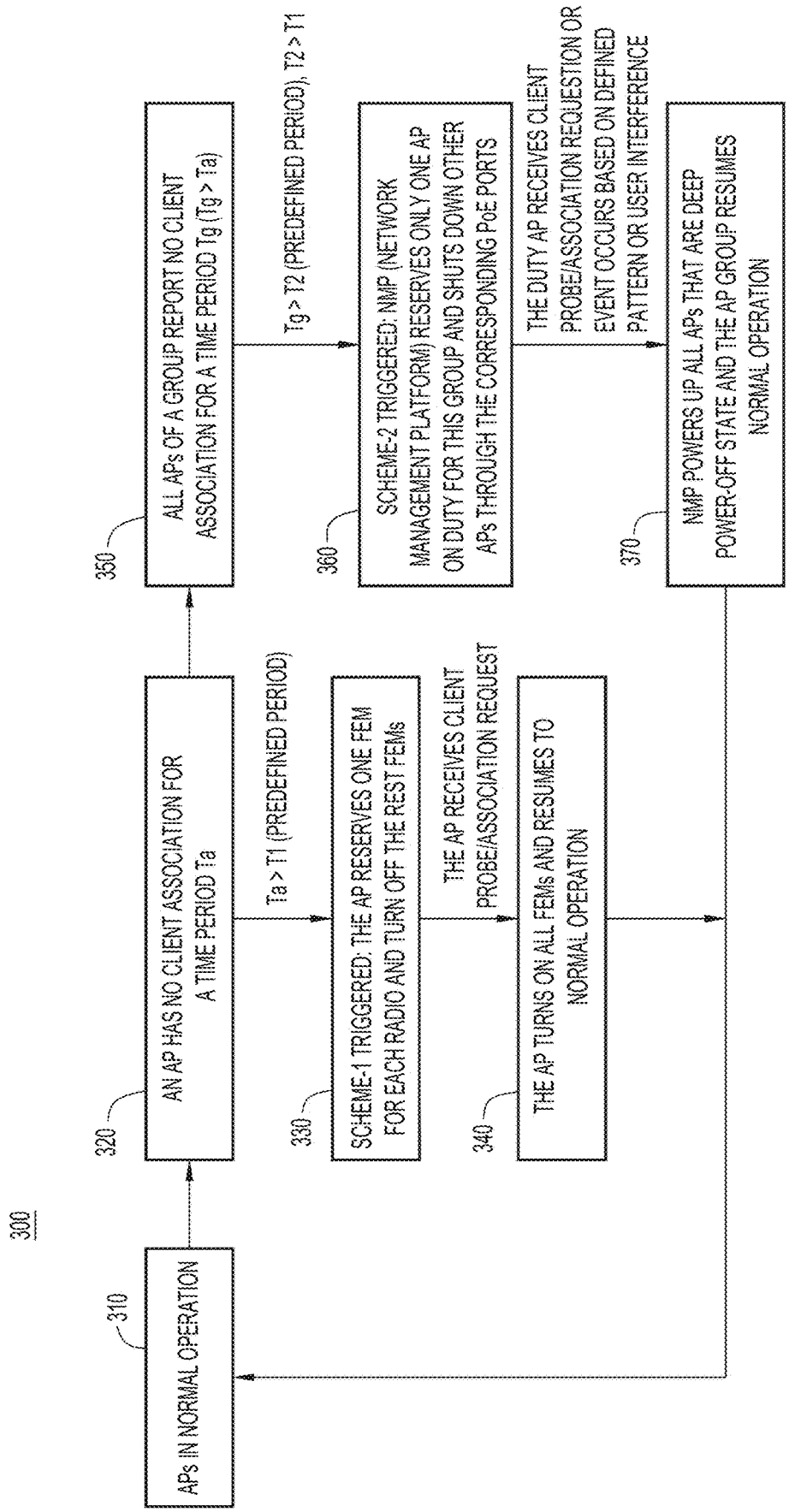
FIG. 3 is a flow chart of a method of dynamically managing the power consumption of access points, according to an example embodiment.

Turning now to FIG. 3, a flow chart is presented of a method 300 of dynamically managing the power consumption of access points, according to an example embodiment.

At operation 310, access points are in a normal operational mode. This operational mode may correspond to a fully-powered mode or a low-power mode (e.g., a standby mode in which energy is still consumed by the FEMs).

At operation 320, an access point is determined to have no client associations for a specified time, $T_a$, which is greater than a first specified threshold duration of time, $T_1$. Threshold $T_1$ may be user-defined or determined using an algorithmic approach (e.g., using a machine learning algorithm), and represents a timeout duration after which a first power management scheme is enabled (operation 330). The first power management scheme causes all but one of the access point's FEMs to be fully powered down by disabling power to those FEMs. Some or all of the wattage that would otherwise have been provided to the disabled FEMs may be directed to the FEM that remains powered, thus increasing its broadcast strength. Thus, one FEM remains operational in order to detect any incoming client probes (e.g., association requests). In various embodiments, the FEM that remains powered-on may operate in a fully-powered state or a standby state. When an access point enters the first power management scheme, the access point may report this state to a network management platform (e.g., network controller 116, depicted and described with reference to FIG. 1).

Once a client association request is detected by the FEM that is powered, the access point turns on all FEMs and resumes normal operation at operation 340. The access point may continue to resume normal operation (returning to operation 310) until another timeout occurs (e.g., when the time $T_a$ without any client request surpasses time threshold $T_1$).

At operation 350, all access points of a group report no client association for a specified time period, $T_g$. Time period $T_g$ is compared to a second threshold duration of time, which may be longer than the first duration of time $T_1$. Thus, individual access points may power down their FEMs before a group of access points reaches the timeout period $T_g$ required to trigger a second power management scheme.

In response to a group of access points not receiving any client association request for a time $T_g$ greater than threshold time $T_2$, a second power management scheme is enabled at operation 360. The network management platform (e.g., network controller 116) may detect that the second threshold duration of time has elapsed, and in response, the network management platform will notify a network switch to shut down all access points in the group but one (the duty access point) through their corresponding PoE ports. The duty access point may intermittently send beacons with increased transmission power to maintain service coverage while listening for a response in the form of a client association request. Once the duty access point receives a client association request, the duty access point informs the network management platform, or the group of access points are required to resume to normal operation by the controller due to any conditions such as a pattern defined by a machine learning model, client roaming, or user interference, and at operation 370, the network management platform powers up all access points in the group that are in the deep power-off state (e.g., by enabling power via the corresponding PoE ports). In some embodiments, access points may require several seconds or minutes to boot up upon receiving power again, so the duty access point may provide essential services until the other access points are operational. Once the group of access points has returned to a normal operational mode, method 300 may resume to operate normally at operation 310 until a threshold duration of time has elapsed again.

Figure 4:
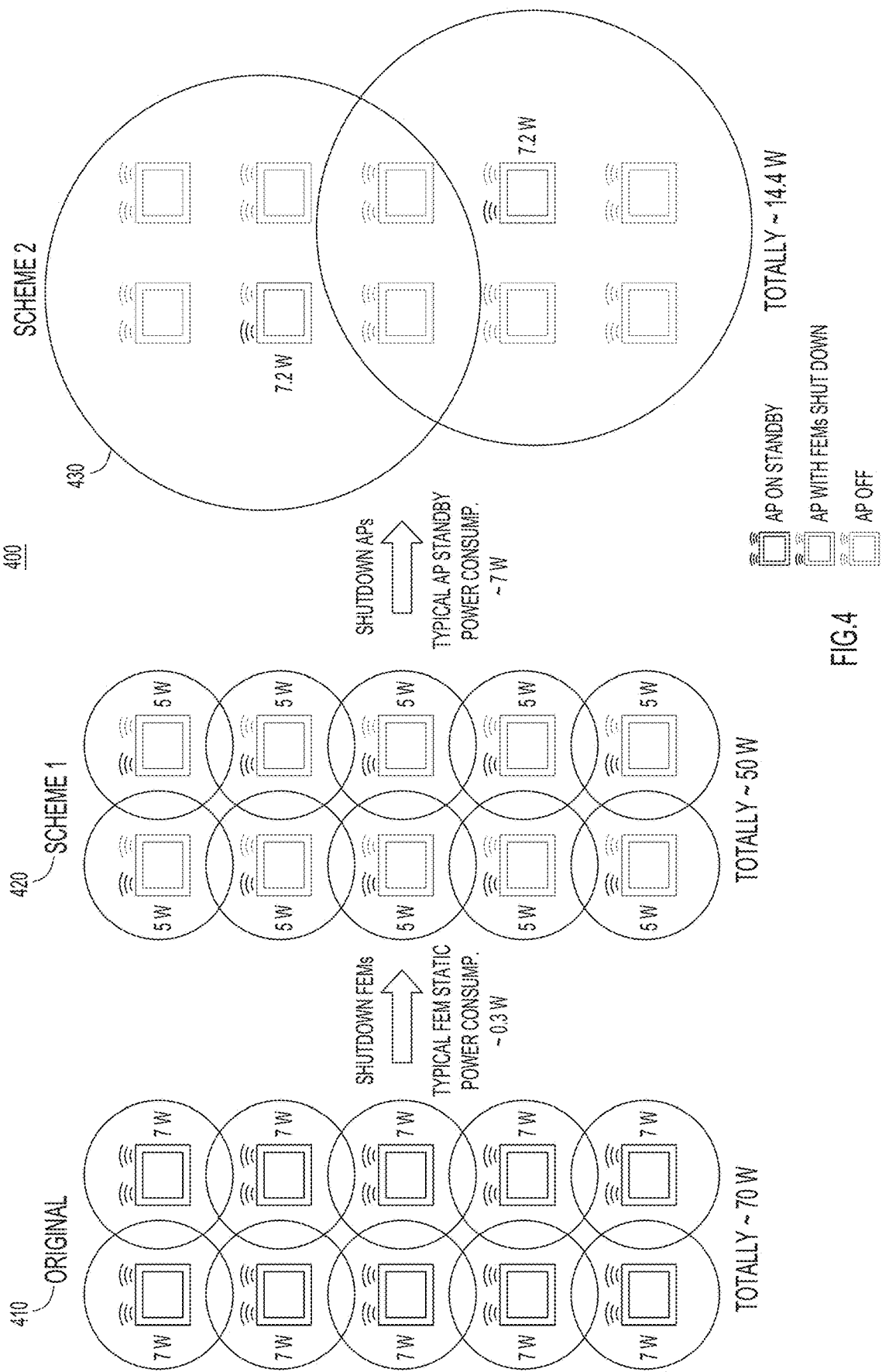
FIG. 4 is a block diagram comparing various power management schemes for a deployment of access points, according to an example embodiment.

FIG. 4 is a block diagram comparing various power management schemes for a deployment 400 of access points, according to an example embodiment.

In power management scheme 410, all of the access points are in a normal standby mode (e.g., without any client associations). As an example, this deployment 400 of access points may consume approximately 70 W total during normal standby. In comparison, in power management scheme 420, all of the access points have deactivated all but one of their FEMs, thereby decreasing the overall power consumption of deployment 400 to 50 W (as each FEM may statically consume approximately 0.3 W).

Next, deployment 400 of access points may enter power management scheme 430 in response to no access point receiving a client association request for a second threshold duration of time. In power management scheme 430, all access points but one per group of access points are disabled. Thus, in the depicted example of deployment 400, there are two groups of access points; accordingly, in power management scheme 430, two duty access points remain active. As depicted, the duty access points may be selected in order to minimize overlap while providing coverage to an area. As each access point may consume 7 W, entering power management scheme 430 causes deployment 400 to have a power consumption of only 14.4 W.

Figure 5A:
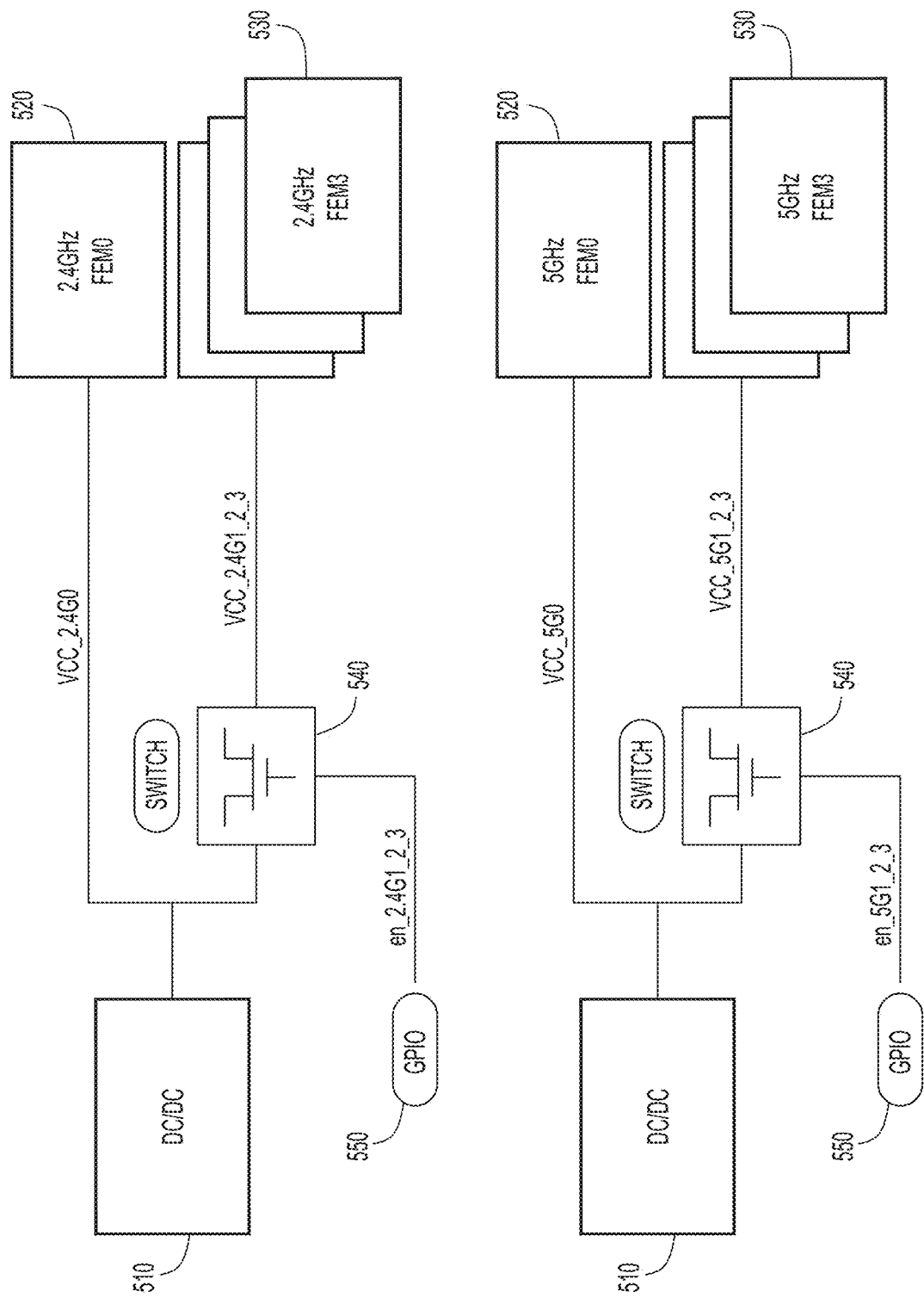
FIGS. 5A and 5B are schematics depicting power management techniques for radio modules, according to an example embodiment
Figure 5B:
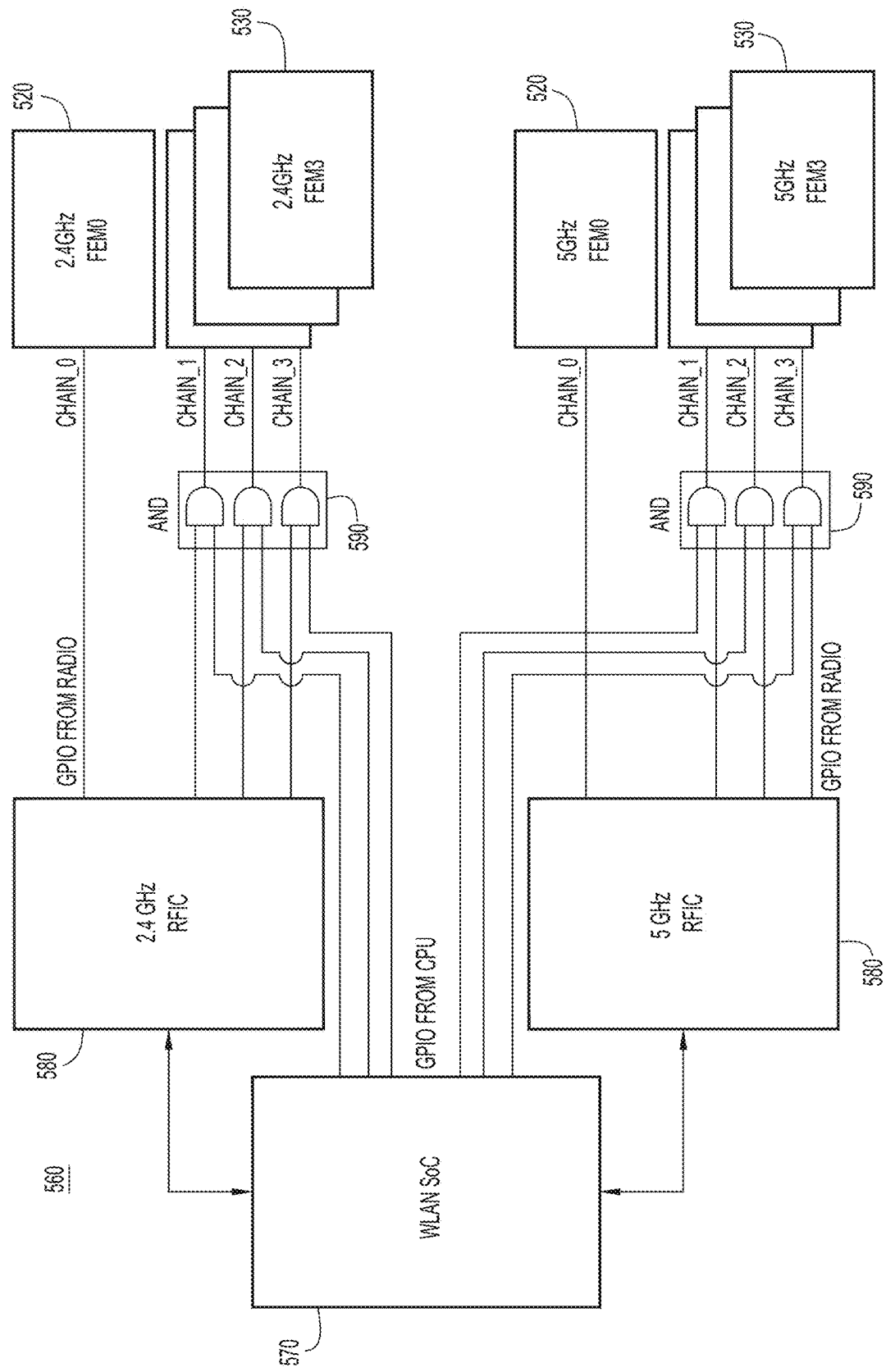

FIGS. 5A and 5B are schematics depicting power management techniques 500 for radio modules, according to an example embodiment. As depicted in FIG. 5A, a direct current/direct current (DC/DC) converter 510 converts a first input voltage to a second output voltage for powering FEMs 520 and 530. In order to disable power to FEMs 530, a switch 540 may be inserted between DC/DC convert 510 and FEMs 530. The switch 540 may be controlled by general-purpose input-output (GPIO) pins 550. Thus, in the power management technique 500 of the depicted example, one 2.4 GHz FEM 520 and one 5.0 GHz FEM 520 remain active, whereas the other FEMs 530 are disabled. In some embodiments, power may be diverted from the disabled FEMs 530 to the active FEM 520, which can increase its broadcast power in order to extend the range of the access point.

Turning now to FIG. 5B, a power management technique 560 is shown in which a wireless local area network (WLAN) system on a chip (SoC) 570 controls two radio-frequency integrated circuits (RFICs) 580, one each for the 2.4 GHz and 5.0 GHz frequencies. GPIOs from WLAN SoC 570 may control logical AND gates 590, which enables software intervention when necessary by pulling the GPIOs down to disable normal GPIO control from RFICs 580 so that WLAN SoC 570 may directly control the GPIOs in order to enable or disable power to FEMs 520 and 530.

Figure 6:
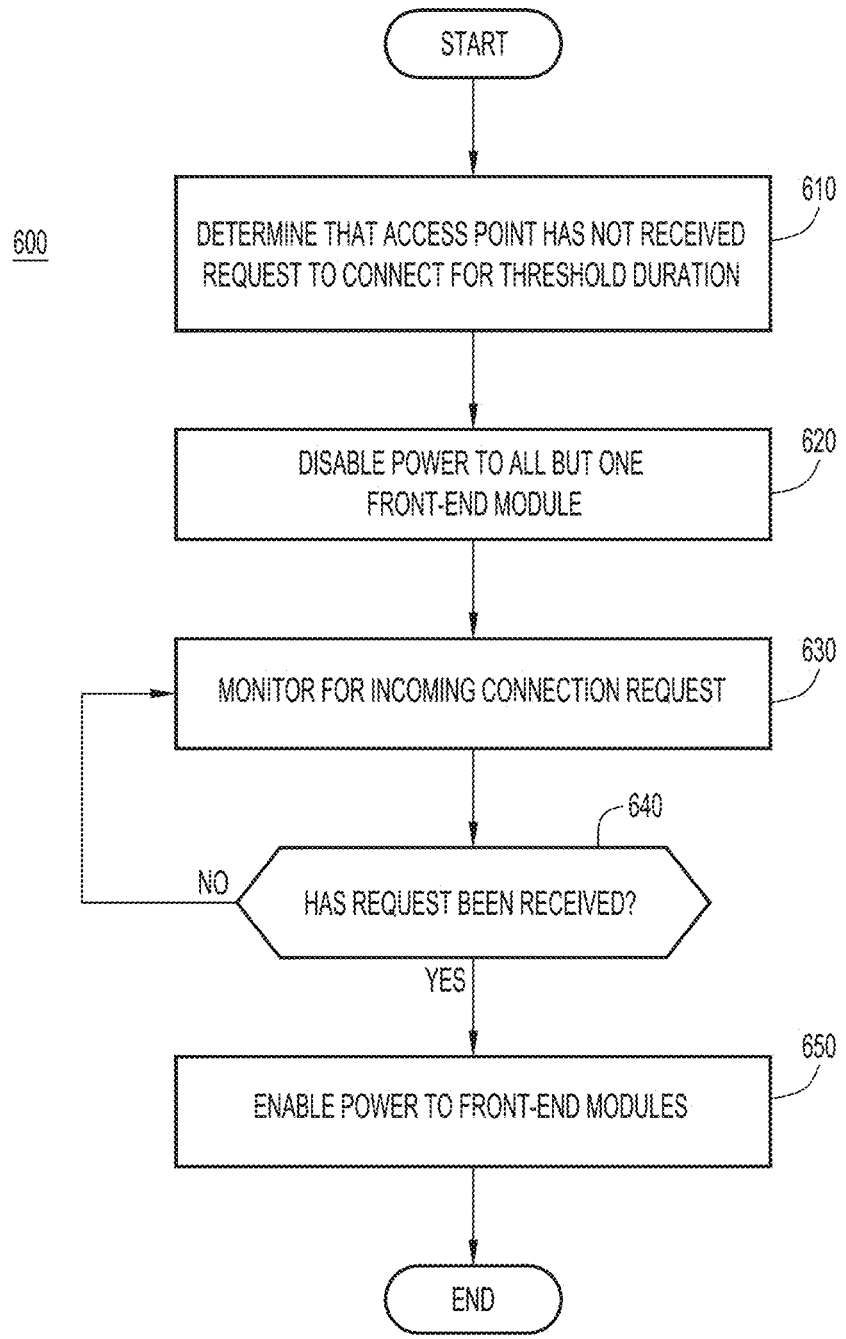
FIG. 6 is a flow chart of a method of managing power consumption of an access point, according to an example embodiment.

FIG. 6 is a flow chart of a method 600 of managing power consumption of an access point, according to an example embodiment.

At operation 610, it is determined that an access point has not received a request from a client to connect for a threshold duration of time. Generally, a client may place a request to connect to an access point, which can initiate a handshake using a specified protocol, after which a client can gain access to one or more networks through the access point. However, when there are no clients nearby, an access point may not receive any requests, indicating that the access point is potentially needlessly consuming energy.

Power is disabled to all but one FEM of the access point at operation 620. In response to determining that no connection requests have been received for a specified amount of time, the FEMs can be disabled, leaving one FEM powered in order to listen for subsequent incoming connection requests. Thus, the access point monitors for incoming connection requests at operation 630.

Operation 640 determines whether a request has been received. If no request is received, then the access point continues to monitor for incoming requests at operation 630. Otherwise, when a connection request is received, then power is enabled to the previously-unpowered FEMs at operation 650. One or more switches may be toggled in the access point in order to enable power to the previously-unpowered FEMs, which can begin to serve as transceivers in order to support various communications with clients.

Figure 7:
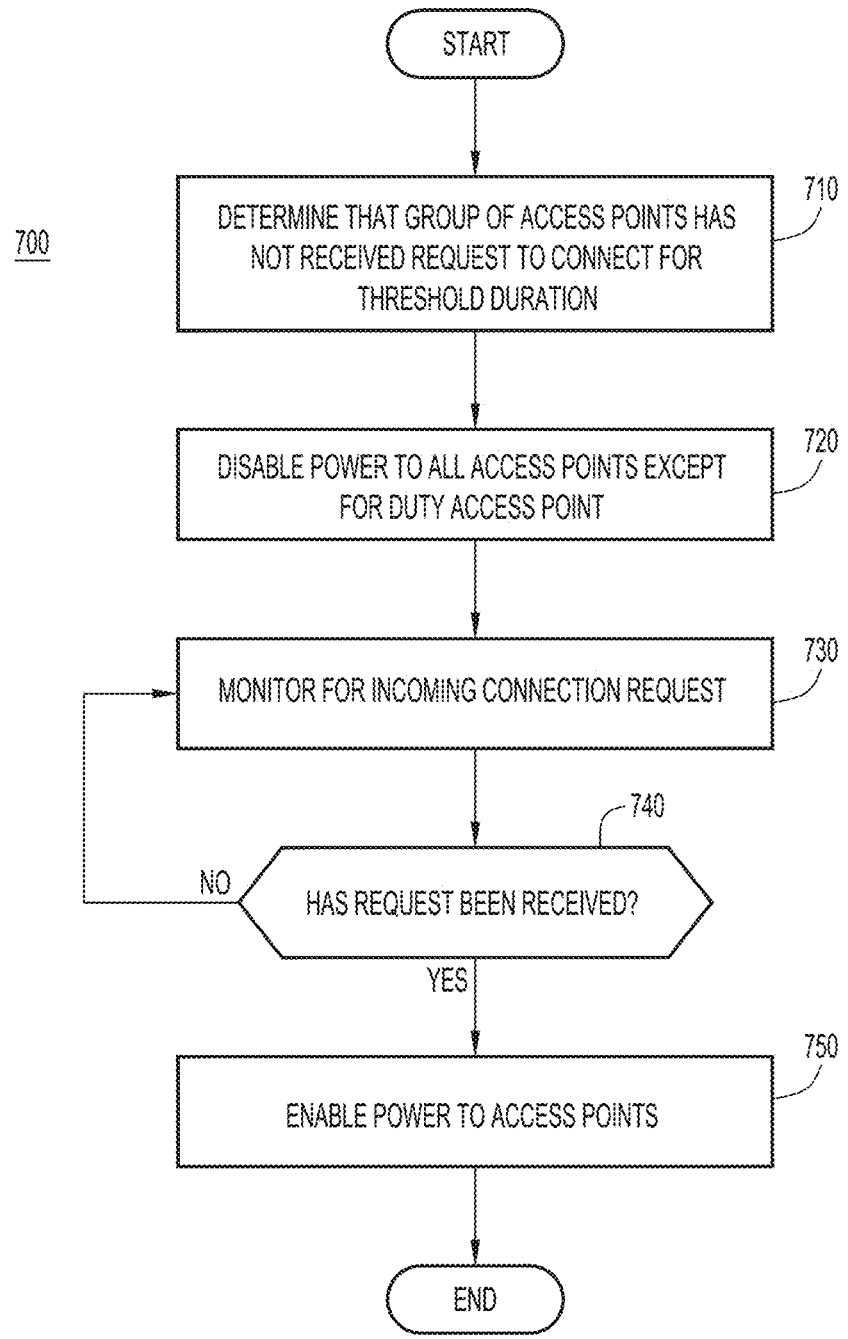
FIG. 7 is a flow chart of a method of managing power consumption of a group of access points, according to an example embodiment.

FIG. 7 is a flow chart of a method 700 of managing power consumption of a group of access points, according to an example embodiment.

At operation 710, it is determined that a group of access points has not received a request from a client to connect for a threshold duration of time. This threshold duration of time may be longer than the threshold duration that is utilized to deactivate FEMs, meaning that the group of access points may have each already disabled their FEMs (except for one FEM each). The group of access points may regularly communicate with a network controller, which may track the time that has elapsed since the last client connection request and compare that time to the threshold duration.

Power is disabled to all access points but the duty access point at operation 720. The network controller may interact with one or more network switches in order to entirely disable power to the access points via PoE ports. Thus, instead of entering a low-power state, the access points are fully disabled, thereby achieving greater energy savings. In some embodiments, when one or more access points are disabled, a switch may repurpose the power that would have been provided to those access points. For example, the power can be provided to other PoE ports according to a predefined priority.

The group of access points is monitored for incoming connection requests at operation 730. Each duty access point may listen with one powered FEM for incoming client association requests.

Operation 740 determines whether a request has been received. When a duty access point receives a client association request, the duty access point may transmit a notification to the network controller. If no request is received, the duty access point continues to monitor for incoming requests at operation 730. However, when a client association request is received, and the network controller is informed, then power is enabled to the previously-unpowered access points at operation 750. In particular, the network controller may transmit instructions that cause a switch to provide power to the previously-unpowered access points via their PoE ports.

Figure 8:
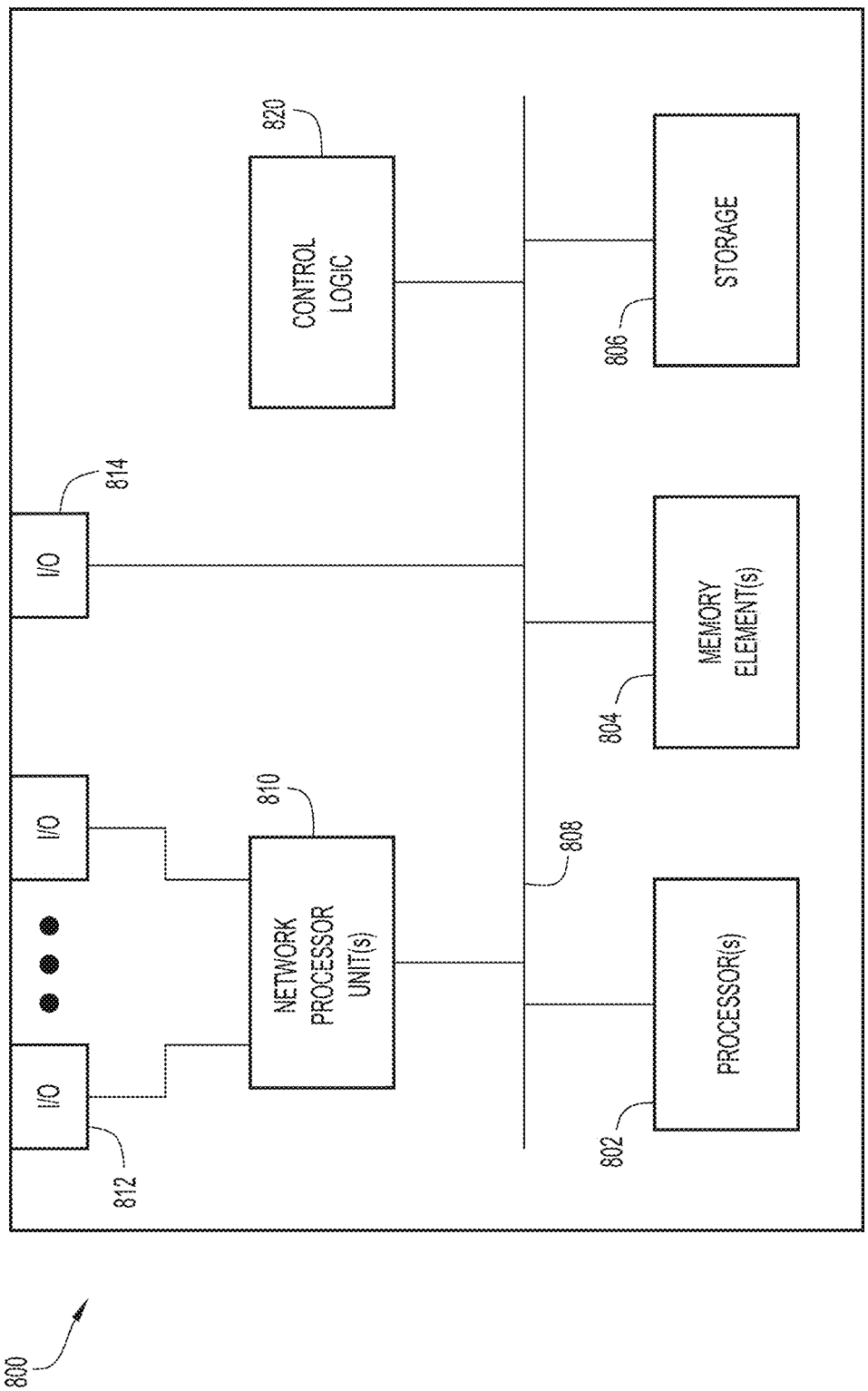
FIG. 8 is a block diagram of a device that may be configured to extract semantically-similar question topics, as presented herein.

Referring now to FIG. 8, FIG. 8 illustrates a hardware block diagram of a computing device 800 that may perform functions associated with operations discussed herein in connection with the techniques depicted in FIGS. 1-7. In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O 814 allow for input and output of data and/or information with other entities that may be connected to computing device 800. For example, I/O 814 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In some aspects, the techniques described herein relate to a computer-implemented method including: determining that a wireless client has not requested to connect to a first access point for a first threshold duration of time; disabling power to one or more front-end modules of a plurality of front-end modules associated with the first access point except for one designated front-end module that remains powered; monitoring for an incoming request to connect to the first access point; and restoring power to the one or more front-end modules of the plurality of front-end modules.

In some aspects, the techniques described herein relate to a computer-implemented method, wherein power is diverted from the one or more front-end modules to the designated front-end module in response to disabling power to the one or more front-end modules.

In some aspects, the techniques described herein relate to a computer-implemented method, wherein disabling power to the one or more front-end modules includes actuating a switch that is provided between a direct current/direct current (DC/DC) module and the one or more front-end modules.

In some aspects, the techniques described herein relate to a computer-implemented method, wherein the first access point is one of a plurality of access points, and further including: determining that the plurality of access points have not received a request to connect for a second threshold duration of time; identifying a duty access point of the plurality of access points; and disabling power to one or more access points of the plurality of access points except for the duty access point.

In some aspects, the techniques described herein relate to a computer-implemented method, wherein disabling power to the one or more access points includes deactivating a power-over-Ethernet port.

In some aspects, the techniques described herein relate to a computer-implemented method, further including: restoring power to the one or more access points in response to the duty access point receiving a request to connect to the duty access point.

In some aspects, the techniques described herein relate to a computer-implemented method, wherein the second threshold duration of time is longer than the first threshold duration of time.

In some aspects, the techniques described herein relate to a computer system including: one or more computer processors; one or more computer readable storage media; and program instructions stored on the one or more computer readable storage media for execution by at least one of the one or more computer processors, the program instructions including instructions to: determine that a wireless client has not requested to connect to a first access point for a first threshold duration of time; disable power to one or more front-end modules of a plurality of front-end modules associated with the first access point except for one designated front-end module that remains powered; monitor for an incoming request to connect to the first access point; and restore power to the one or more front-end modules of the plurality of front-end modules.

In some aspects, the techniques described herein relate to a computer system, wherein power is diverted from the one or more front-end modules to the designated front-end module in response to disabling power to the one or more front-end modules.

In some aspects, the techniques described herein relate to a computer system, wherein disabling power to the one or more front-end module includes actuating a switch that is provided between a direct current/direct current (DC/DC) module and the one or more front-end modules.

In some aspects, the techniques described herein relate to a computer system, wherein the first access point is one of a plurality of access points, and wherein the program instructions further include instructions to: determine that the plurality of access points have not received a request to connect for a second threshold duration of time; identify a duty access point of the plurality of access points; and disable power to one or more access points of the plurality of access points except for the duty access point.

In some aspects, the techniques described herein relate to a computer system, wherein disabling power to the one or more access points includes deactivating a power-over-Ethernet port.

In some aspects, the techniques described herein relate to a computer system, wherein the program instructions further include instructions to: restore power to the one or more access points in response to the duty access point receiving a request to connect to the duty access point.

In some aspects, the techniques described herein relate to a computer system, wherein the second threshold duration of time is longer than the first threshold duration of time.

In some aspects, the techniques described herein relate to a computer program product including one or more computer readable storage media collectively having program instructions embodied therewith, the program instructions executable by a computer to cause the computer to perform operations including: determine that a wireless client has not requested to connect to a first access point for a first threshold duration of time; disable power to one or more front-end modules of a plurality of front-end modules associated with the first access point except for one designated front-end module that remains powered; monitor for an incoming request to connect to the first access point; and restore power to the one or more front-end modules of the plurality of front-end modules.

In some aspects, the techniques described herein relate to a computer program product, wherein power is diverted from the one or more front-end modules to the designated front-end module in response to disabling power to the one or more front-end modules.

In some aspects, the techniques described herein relate to a computer program product, wherein disabling power to the one or more front-end modules includes actuating a switch that is provided between a direct current/direct current (DC/DC) module and the one or more front-end modules.

In some aspects, the techniques described herein relate to a computer program product, wherein the first access point is one of a plurality of access points, and wherein the program instructions further cause the computer to: determine that the plurality of access points have not received a request to connect for a second threshold duration of time; identify a duty access point of the plurality of access points; and disable power to one or more access points of the plurality of access points except for the duty access point.

In some aspects, the techniques described herein relate to a computer program product, wherein disabling power to the one or more access points includes deactivating a power-over-Ethernet port.

In some aspects, the techniques described herein relate to a computer program product, wherein the program instructions further cause the computer to: restore power to the one or more access points in response to the duty access point receiving a request to connect to the duty access point.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   determining that a wireless client has not requested to connect to a first access point for a first threshold duration of time;
   disabling power to one or more front-end modules of a plurality of front-end modules associated with the first access point except for one designated front-end module that remains powered;
   monitoring for an incoming request to connect to the first access point; and
   restoring power to the one or more front-end modules of the plurality of front-end modules.

2. The computer-implemented method of claim 1, wherein power is diverted from the one or more front-end modules to the designated front-end module in response to disabling power to the one or more front-end modules.

3. The computer-implemented method of claim 1, wherein disabling power to the one or more front-end modules comprises actuating a switch that is provided between a direct current/direct current (DC/DC) module and the one or more front-end modules.

4. The computer-implemented method of claim 1, wherein the first access point is one of a plurality of access points, and further comprising:
   determining that the plurality of access points have not received a request to connect for a second threshold duration of time;
   identifying a duty access point of the plurality of access points; and
   disabling power to one or more access points of the plurality of access points except for the duty access point.

5. The computer-implemented method of claim 4, wherein disabling power to the one or more access points comprises deactivating a power-over-Ethernet port.

6. The computer-implemented method of claim 4, further comprising:
   restoring power to the one or more access points in response to the duty access point receiving a request to connect to the duty access point.

7. The computer-implemented method of claim 4, wherein the second threshold duration of time is longer than the first threshold duration of time.

8. A computer system comprising:
   one or more computer processors;
   one or more computer readable storage media; and
   program instructions stored on the one or more computer readable storage media for execution by at least one of the one or more computer processors, the program instructions comprising instructions to:
      determine that a wireless client has not requested to connect to a first access point for a first threshold duration of time;
      disable power to one or more front-end modules of a plurality of front-end modules associated with the first access point except for one designated front-end module that remains powered;
      monitor for an incoming request to connect to the first access point; and
      restore power to the one or more front-end modules of the plurality of front-end modules.

9. The computer system of claim 8, wherein power is diverted from the one or more front-end modules to the designated front-end module in response to disabling power to the one or more front-end modules.

10. The computer system of claim 8, wherein disabling power to the one or more front-end modules comprises actuating a switch that is provided between a direct current/direct current (DC/DC) module and the one or more front-end modules.

11. The computer system of claim 8, wherein the first access point is one of a plurality of access points, and wherein the program instructions further comprise instructions to:

determine that the plurality of access points have not received a request to connect for a second threshold duration of time;

identify a duty access point of the plurality of access points; and disable power to one or more access points of the plurality of access points except for the duty access point.

12. The computer system of claim 11, wherein disabling power to the one or more access points comprises deactivating a power-over-Ethernet port.

13. The computer system of claim 11, wherein the program instructions further comprise instructions to:

restore power to the one or more access points in response to the duty access point receiving a request to connect to the duty access point.

14. The computer system of claim 11, wherein the second threshold duration of time is longer than the first threshold duration of time.

15. A non-transitory computer readable memory having program instructions embodied therewith, the program instructions executable by a computer to cause the computer to perform operations including:

determine that a wireless client has not requested to connect to a first access point for a first threshold duration of time;

disable power to one or more front-end modules of a plurality of front-end modules associated with the first access point except for one designated front-end module that remains powered;

monitor for an incoming request to connect to the first access point; and restore power to the one or more front-end modules of the plurality of front-end modules.

16. The non-transitory computer readable memory of claim 15, wherein power is diverted from the one or more front-end modules to the designated front-end module in response to disabling power to the one or more front-end modules.

17. The non-transitory computer readable memory of claim 15, wherein disabling power to the one or more front-end modules comprises actuating a switch that is provided between a direct current/direct current (DC/DC) module and the one or more front-end modules.

18. The non-transitory computer readable memory of claim 15, wherein the first access point is one of a plurality of access points, and wherein the program instructions further cause the computer to:

determine that the plurality of access points have not received a request to connect for a second threshold duration of time;

identify a duty access point of the plurality of access points; and disable power to one or more access points of the plurality of access points except for the duty access point.

19. The non-transitory computer readable memory of claim 18, wherein disabling power to the one or more access points comprises deactivating a power-over-Ethernet port.

20. The non-transitory computer readable memory of claim 18, wherein the program instructions further cause the computer to:

restore power to the one or more access points in response to the duty access point receiving a request to connect to the duty access point.

\* \* \* \* \*